(12) United States Patent
Punith et al.

(10) Patent No.: US 11,780,488 B2
(45) Date of Patent: Oct. 10, 2023

(54) STEERING WHEEL ARRANGEMENT

(71) Applicant: VOLVO TRUCK CORPORATION, Gothenburg (SE)

(72) Inventors: Rangegowda Punith, Karnataka (IN); R. Sushma, Bangalore (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/061,179

(22) Filed: Dec. 2, 2022

(65) Prior Publication Data

US 2023/0174134 A1 Jun. 8, 2023

(30) Foreign Application Priority Data

Dec. 2, 2021 (EP) .................................... 21212064

(51) Int. Cl.
*B62D 1/04* (2006.01)
*B62D 1/10* (2006.01)

(52) U.S. Cl.
CPC ............... *B62D 1/04* (2013.01); *B62D 1/105* (2013.01); *B62D 1/046* (2013.01)

(58) Field of Classification Search
CPC . B62D 1/04; B62D 1/046; B62D 1/10; B62D 1/105; G05G 1/08
See application file for complete search history.

(56) References Cited

U.S. PATENT DOCUMENTS 3,543,874 A * 12/1970 Nevett .................... B60K 37/00
74/498
3,548,128 A * 12/1970 Willett .................... B62D 1/185
200/61.57

(Continued)

FOREIGN PATENT DOCUMENTS

DE  2131902 A1 * 12/1972
DE  4428883 C1 * 12/1995 ........... B60Q 1/1461

(Continued)

OTHER PUBLICATIONS

Machine translation of JP 58-36743 A obtained on Mar. 15, 2023.*
Extended European Search Report in corresponding European Application No. 21212064.6 dated May 19, 2022 (5 pages).

*Primary Examiner* — Adam D Rogers
(74) *Attorney, Agent, or Firm* — Venable LLP; Jeffri A. Kaminski

(57) ABSTRACT

A steering wheel arrangement includes a steering wheel rotatable about a rotation axis, a steering shaft, a stationary housing covering at least partially the steering shaft and supporting at least one accessory, a plurality of coupling elements adapted to couple the steering wheel to the steering shaft, such that rotation of the steering wheel causes rotation of the steering shaft. Each coupling element is integral in rotation with the steering shaft and slidably movable along an axial direction between an upper position and a lower position, and wherein each coupling element is detachably connected to the steering wheel, each coupling element being connected to the steering wheel in its upper position, such that rotation of the steering wheel causes rotation of the coupling element, and being disconnected from the steering wheel in its lower position, such that rotation of the steering wheel does not cause rotation of the coupling element.

15 Claims, 8 Drawing Sheets

(56) References Cited

U.S. PATENT DOCUMENTS

| | | | | |
|---|---|---|---|---|
| 5,855,449 A * | 1/1999 | Thomas | ............... | B62D 1/10 |
| | | | | 74/552 |
| 5,855,451 A * | 1/1999 | Milton | ............... | F16D 1/0894 |
| | | | | 74/552 |
| 10,279,882 B2 * | 5/2019 | Tosini | ............... | B62D 1/105 |
| 2006/0057863 A1 * | 3/2006 | Araki | ............... | B60R 16/027 |
| | | | | 439/15 |
| 2008/0236328 A1 * | 10/2008 | Ai | ............... | B62D 1/105 |
| | | | | 74/552 |

FOREIGN PATENT DOCUMENTS

| | | | |
|---|---|---|---|
| DE | 102004059551 A1 | | 6/2006 |
| JP | 57198141 A | * | 12/1982 |
| JP | S5836743 A | | 3/1983 |
| JP | 59156862 A | * | 9/1984 |

* cited by examiner

STEERING WHEEL ARRANGEMENT

TECHNICAL FIELD

The invention relates to a steering wheel arrangement for a vehicle.

The invention can be applied in heavy-duty vehicles, such as trucks, buses and construction equipment, or in other vehicles, such as a car.

BACKGROUND

Conventional vehicles are fitted with a steering wheel to control the orientation of the wheels. Such a steering wheel is made up of a steering wheel ring, a hub and one or more radial spokes that connect the steering wheel ring to the hub. The steering wheel hub causes a steering shaft to rotate. Other accessories, such as an air bag or a horn pad, may also be contained in, or disposed on, the steering wheel hub.

Moreover, conventional vehicles comprise information displays that are generally located on the dashboard behind the steering wheel. This location impedes the driver's ability to read the information provided by the displays, because the radial stokes may be in the line of view.

To solve this visibility issue, prior art solutions propose to put the information displays on the steering wheel. These solutions permit to position the information displays closer to the driver's eyes and avoid the occultation produced by the radial stokes.

However, in these known solutions, the information displays rotate together with the steering wheel. This leads to other visibility issues, in particular when the information displays consist in fuel gauges, speedometers or tachometers that cannot be easily read by the driver if the steering wheel rotates too much.

SUMMARY

An object of the invention is to provide a steering wheel arrangement, which provides a solution to the visibility issues of conventional vehicles while avoiding the drawbacks of the prior art solutions.

Thus configured, the steering wheel arrangement of the present invention permits to position the information displays closer to the driver's eyes due to their integration in the steering wheel, thus improving the driver's visibility. Furthermore, the information displays being stationary in the steering wheel arrangement, the readability of the information displayed is not impacted by the rotation of the steering wheel.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
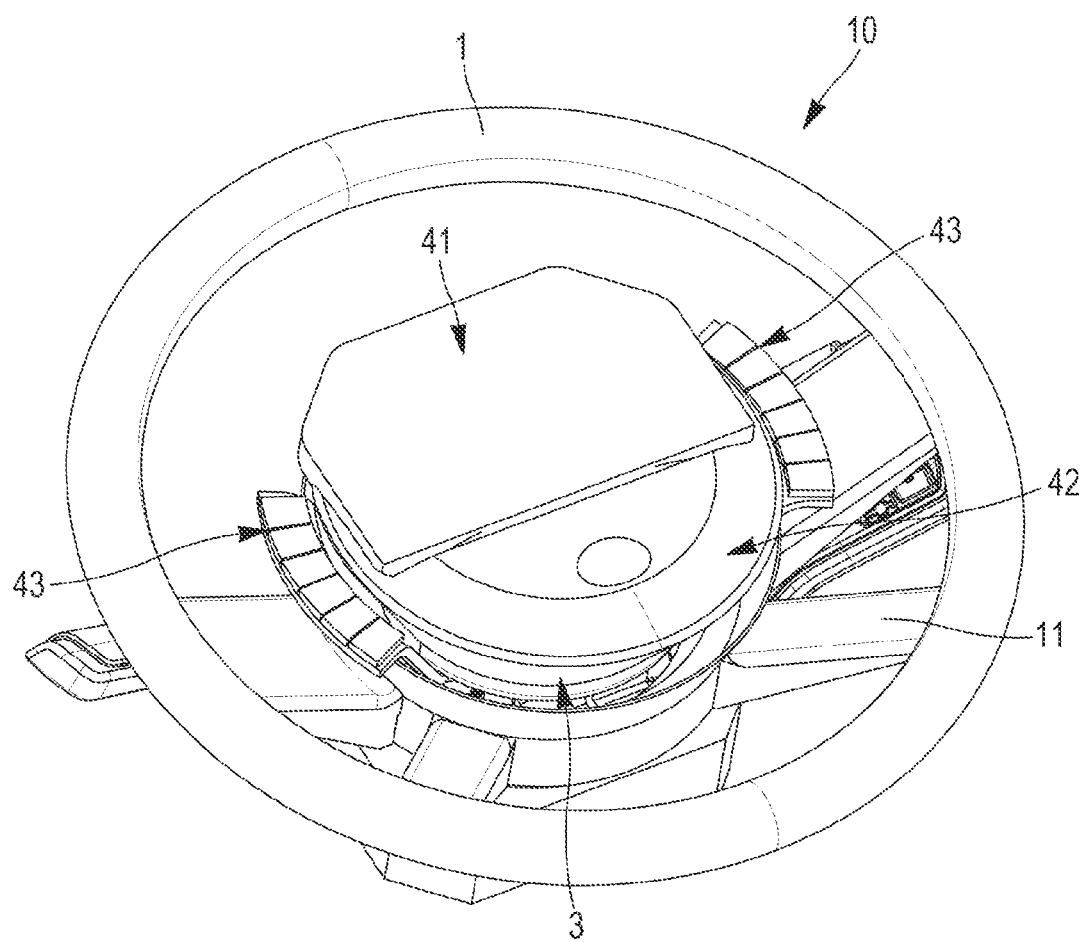
FIG. 1 is a perspective view of a steering wheel arrangement according to a first embodiment of the invention.
Figure 2:
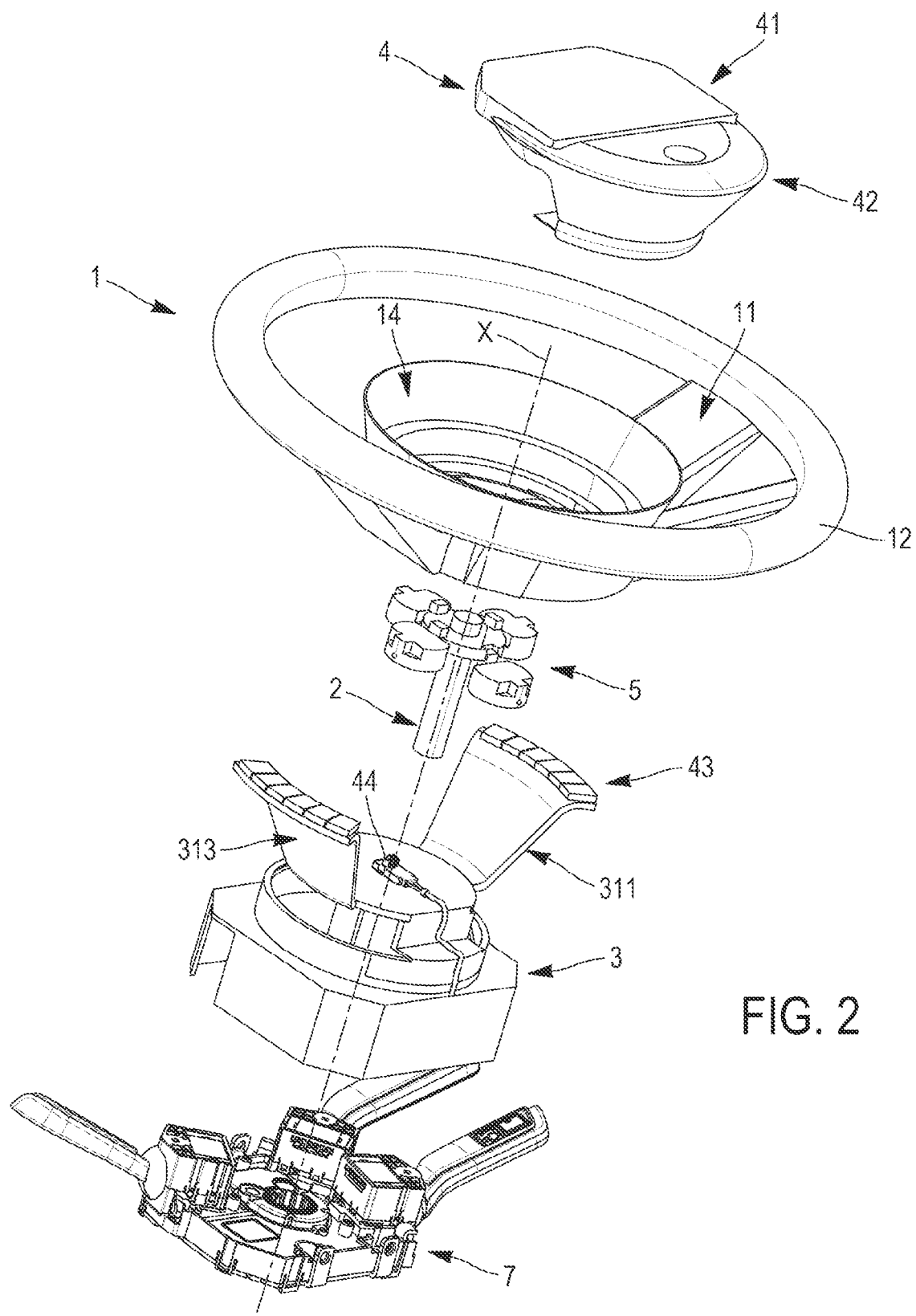
FIG. 2 is an exploded view of the steering wheel arrangement of FIG. 1.

FIGS. 1 and 2 illustrate a first embodiment of a steering wheel arrangement according to the invention. In this embodiment, the steering wheel arrangement 10 comprises a steering wheel 1 rotatable about a rotation axis X, a steering shaft 2, a stationary housing 3 covering at least partially the steering shaft 2 and a coupling mechanism 5 adapted to couple the steering wheel 1 to the steering shaft 2, such that rotation of the steering wheel causes rotation of the steering shaft. The coupling mechanism 5 is disclosed in detail in the following paragraphs and by reference to FIGS. 3 to 6. This steering wheel arrangement 10 is adapted to be mounted to the steering column (not shown) of a vehicle, an optional stalk set 7 being positioned between the housing 3 and the steering column.

The steering wheel arrangement 10 further comprises a central console 4 disposed in the central area of the steering wheel 1, above radial spokes 11 that connect an outer ring 12 to a central crown 14, the central console 4 being partially received inside the central crown 14. This central console 4 may be used for various purposes and, in particular, may incorporate one or several accessories, such as a multi-information display unit 41 and an air bag module 42 as illustrated in FIGS. 1 and 2. Other accessories may be used in replacement to and in addition to these accessories. For example, the central console 4 may also include a horn pad. Other accessories, such as switches 43, may be fixedly connected to or integral with left and right convex-shaped wings 311, 313 of the housing 3 that are radially disposed around the central crown 14, said switches 43 being electrically connected to a control unit (not shown) via electrical wires 44. Other electrical wires 44 may be also provided to supply current to the air bag module 42.

The central console 4 is fixedly connected to the stationary housing 3 through any conventional connecting means. Thus, when the steering wheel 1 rotates, the central console 4 remains stationary. This stationary position of the central console 4 allows the information displayed by the multi-information display unit 41 to be always visible to the driver whatever the angular position of the steering wheel. In the same way, the stationary position of the air bag module 42 allows the air bag to be always in the best position to guarantee maximum safety for the driver. Furthermore, this non-rotating air bag module 42 avoids the addition of a clock-spring rotor on which the wires 44 are mounted, said clock-spring rotor following the rotation of the air bag module in the prior art steering wheels.

Figure 3:
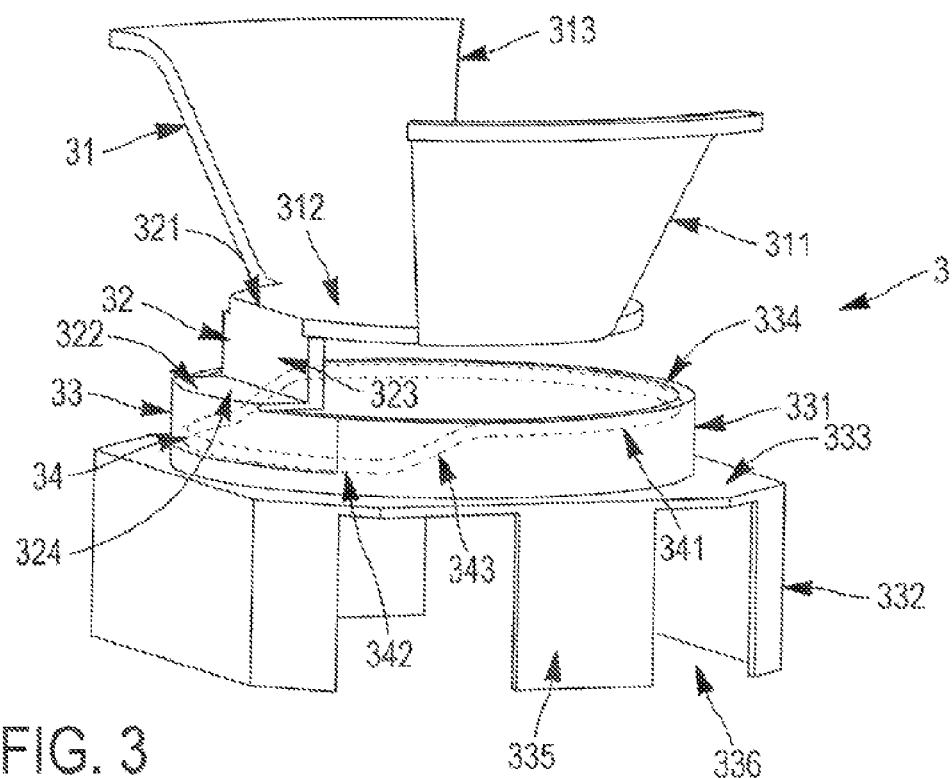
FIG. 3 is a perspective view of the housing of the steering wheel arrangement of FIG. 1.

FIG. 3 is an enlarged view of the housing 3 that is illustrated in FIG. 2, the switches 43 and the wires 44 being not shown. This housing 3 comprises an upper part 31 and a lower part 33 connected by a single crosspiece 32. The upper part 31 includes a central base 312, which is substantially flat and circular, and which is aligned in a plane perpendicular to the axis X. The wings 311, 313 supporting the switches 43 protrude upwards from two radially opposite peripheral edges of the central base 312. The lower part 33 comprises a proximal portion 331 and a distal portion 332, the proximal portion 331 being closer to the upper part 31 than the distal portion 332. The proximal portion 331 has an annular shape and is connected to the central base 312 of the upper part 31 by the crosspiece 32, said crosspiece 32 being adapted to maintain a constant axial spacing between said central base 312 and an upper peripheral edge 334 of said proximal portion 331. The distal portion 332 has a parallelepiped shape and comprises an octagonal upper face 333 that is contiguous to the proximal portion 331 and eight side faces 335, four of which being provided with rectangular openings 336 through which the stalks of the stalk set 7 protrude. The crosspiece 32 extends between an upper end 321, which is defined by a straight end edge of the central base 312 of the upper part 31, and a lower end 322, which is defined by a hemispherical portion of the upper peripheral edge 334 of the proximal portion 331. The crosspiece 32 comprises a first planar section 323 aligned in an axial direction and a second planar section 324 perpendicular to the first planar section 323, the first planar section 323 being integral with the upper part 31 along the upper end 321 and the second planar section 324 being integral with the lower part 33 along the lower end 322.

As illustrated in FIG. 3 by means of a broken line, the internal periphery of the proximal portion 331 is provided with a groove 34 that defines a closed path. The groove 34 includes an upper section 341 and a lower section 342, said upper and lower sections 341, 342 being shaped like a portion of a ring and being axially distant from each other. The upper and lower sections are linked by two intermediate sections 343 extending obliquely relative the respective planes define by said upper and lower sections 341, 342. At least a part of the lower section 342 is axially aligned with the lower end 322 of the crosspiece 32. As explained in detail in the following paragraphs, this groove 34 defines the path followed by coupling elements 50 of the steering wheel arrangement 10 during the rotation of the steering wheel. In particular, the upper section 341 of the groove 34 is adapted to define an upper position of said coupling elements 50 and the lower section 342 is adapted to define a lower position of said coupling elements 50. More specifically, the groove 34 is configured such that, when the coupling elements 50 are in their lower position, they are axially positioned below the crosspiece 32, and, when the coupling elements 50 are in their upper position, they are aligned with the crosspiece 32 in a plane perpendicular to the rotation axis X.

Figure 4:
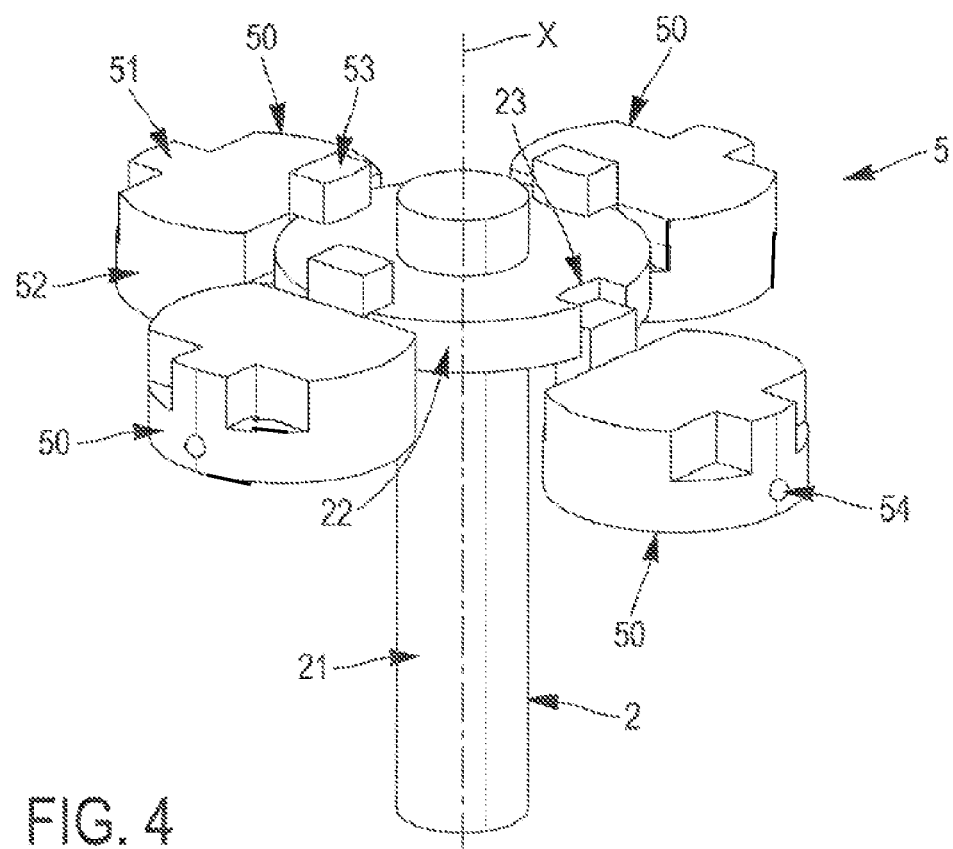
FIG. 4 is a perspective view of the coupling mechanism that causes rotation of the steering shaft in the steering wheel arrangement of FIG. 1.

FIG. 4 is an enlarged view of the coupling mechanism 5 that is illustrated in FIG. 2. This coupling mechanism 5 comprises four coupling elements 50 disposed around the steering shaft 2 at regular angular intervals. Each coupling element 50 is formed of a substantially flat and circular base 52 and of two coupling teeth, respectively a distal coupling tooth 51 and a proximal coupling tooth 53, projecting axially from said base 52, the height of the proximal tooth 53 being greater than the height of the distal tooth 51. The distal coupling tooth 51 and the proximal coupling tooth 53 of each coupling element 50 are aligned in a radial direction. The steering shaft 2 comprises an axle 21 defining the rotation axis X and a disc-shaped tray 22 coaxially mounted on the axle 21. The tray 22 is provided with a series of four proximal notches 23 on its outer periphery, each proximal notch 23 being configured to slidably receive the proximal tooth 53 of one of the coupling elements 50. Thus, a torque can be transmitted to the steering shaft 2 when the coupling elements 50 rotate or, inversely, a torque can be transmitted to the coupling elements 50 when the steering shaft 2 rotates. The proximal tooth 53 axially moves inside the notch 23 depending on the position of the coupling element 50. This position results from the engagement of a hemispherical tab 54 protruding from an external side of the distal coupling tooth 51 of the coupling element 50 inside the groove 34 of the housing 3. Thus, when the tab 54 follows the path defined by the upper section 341 of the groove 34, the coupling element 50 is in its upper position, and, when the tab 54 follows the path defined by the lower section 342 of the groove 34, the coupling element 50 is in its lower position. In this lower position, the coupling element 50 is positioned below the crosspiece 32, thus avoiding a restriction in the movement of the coupling element 50 due to the presence of the crosspiece 32 against which the coupling element 50 would abut if it were kept constantly in its upper position. The specific path defined by the groove 34 thus allows a 360° rotation of the coupling element 50 about the rotation axis X.

Figure 5:
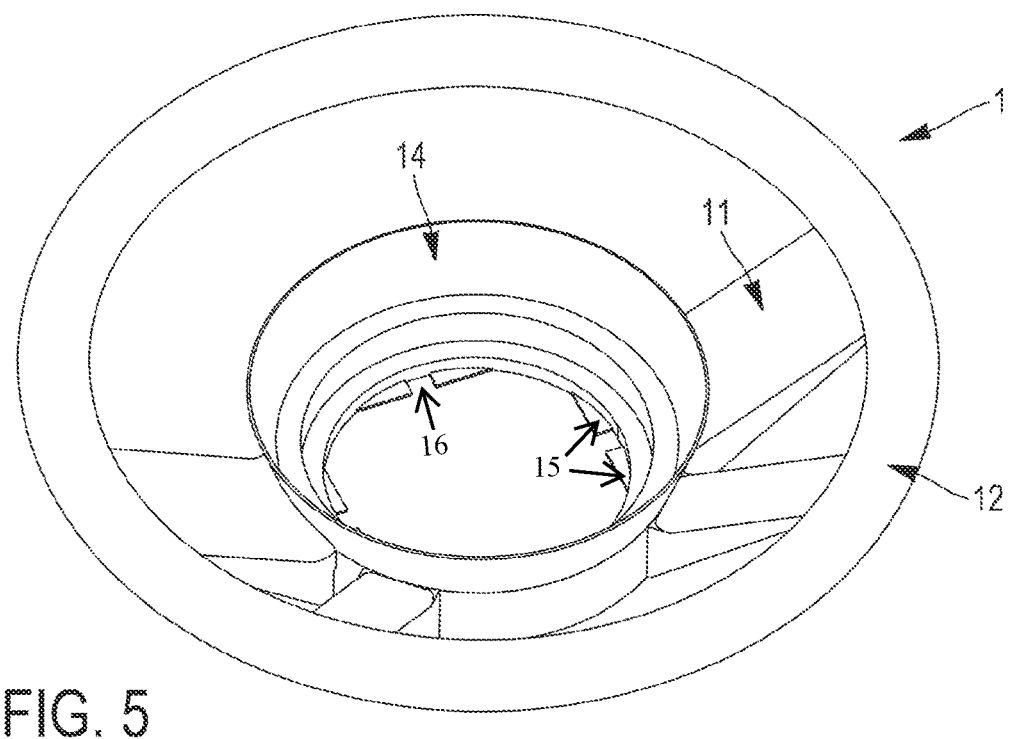
FIG. 5 is a perspective view of the steering wheel of the steering wheel arrangement of FIG. 1.
Figure 6:
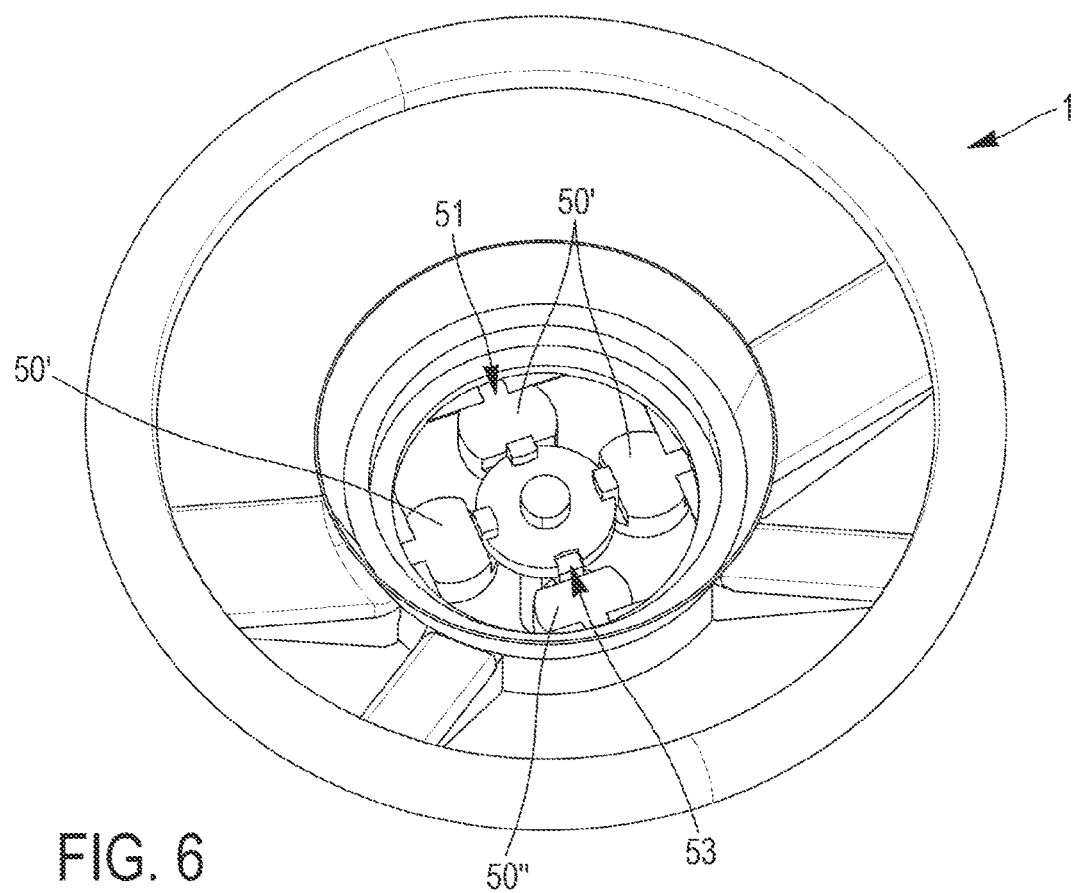
FIG. 6 is a view similar to FIG. 5, when the coupling mechanism of FIG. 4 is coupled to the steering wheel.

The rotation of the coupling elements 50 results from the rotation of the steering wheel 1. Indeed, as illustrated in FIGS. 5 and 6, the central crown 14 of the steering wheel 1 is provided with a series of four distal notches 16, each distal notch 16 being defined by a pair of adjacent segments 15 protruding from the inner periphery 13 of the central crown 14. Each distal notch 16 is configured to receive the distal coupling tooth 51 of the coupling elements 50 when said coupling elements 50 are in their upper position (corresponding to the position of the coupling elements 50' illustrated in FIG. 6), thus ensuring the transmission of a torque to said coupling element 50 when the steering wheel 1 rotates. When the coupling elements 50 are in their lower position (corresponding to the position of the coupling element 50" illustrated in FIG. 6), this distal tooth 51 is out of the distal notch 16, but, due to its greater height, the proximal tooth 53 is still received in the proximal notch 23. Thus, in this lower position, the torque generated by the steering wheel 1 is not transmitted to the coupling element 50". However, the coupling element 50" rotates due to the engagement of the proximal tooth 53 in the proximal notch 23 that transmits the torque generated by the steering shaft 2 under the action of the coupling elements 50'. In the embodiment shown, the steering wheel arrangement 1 is configured such that at least three coupling elements 50 are in their upper position whatever the angular position of steering wheel 1. In alternative embodiments of the present invention, the steering wheel arrangement 1 may comprise only three coupling elements 50 or more than four coupling elements 50. In further alternative embodiments of the present invention, the groove 34 may comprise two or more lower sections 342, each lower section 342 being axially aligned with a corresponding crosspiece 32 of the housing 3 that connect the upper and lower parts 31, 33.

Figure 7:
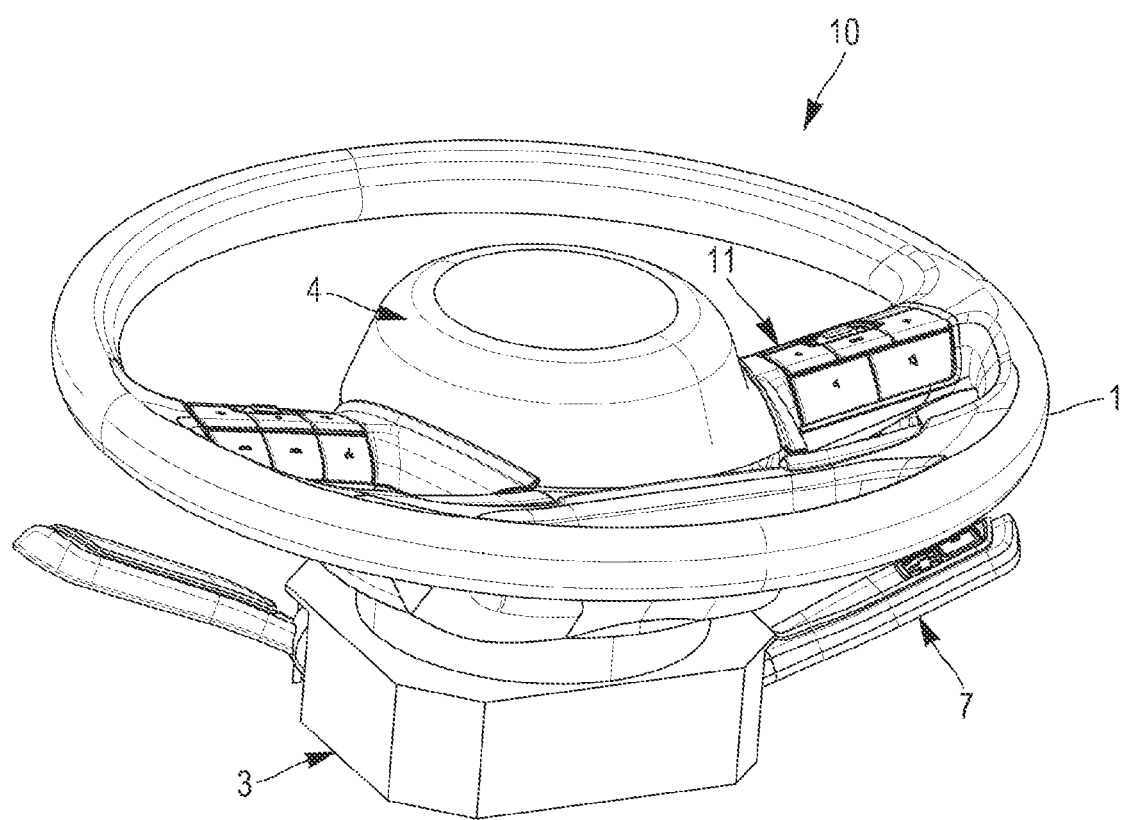
FIG. 7 is a perspective view of a steering wheel arrangement according to a second embodiment of the invention.
Figure 8:
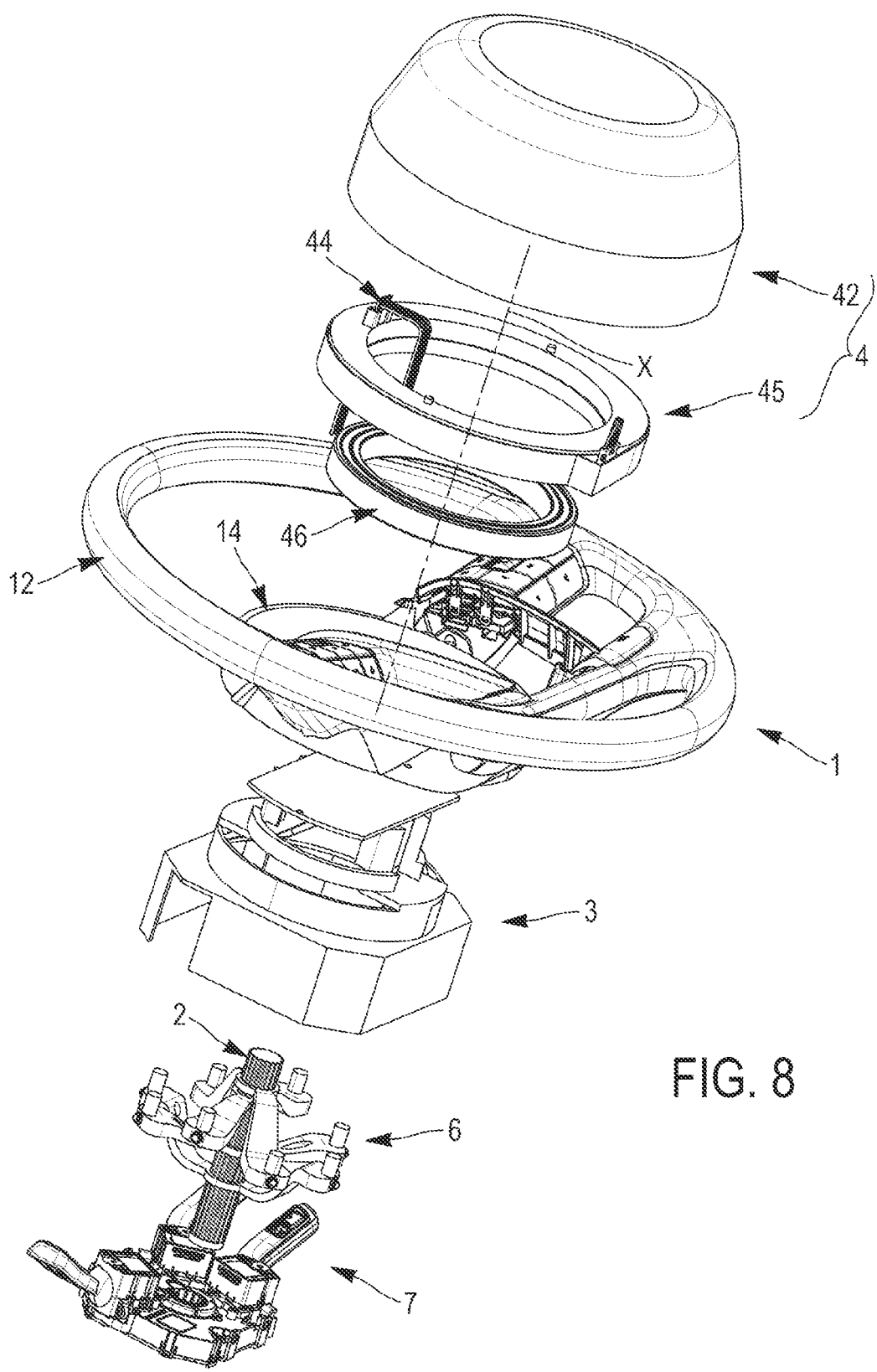
FIG. 8 is an exploded view of the steering wheel arrangement of FIG. 7.

FIGS. 7 and 8 illustrate a second embodiment of a steering wheel arrangement according to the invention. The elements of this second embodiment having a similar function and design to those of the first embodiment hold the same reference numbers. In this embodiment, the steering wheel arrangement 10 comprises a steering wheel 1 rotatable about a rotation axis X, a steering shaft 2, a stationary housing 3 covering at least partially the steering shaft 2 and a coupling mechanism 6 adapted to couple the steering wheel 1 to the steering shaft 2, such that rotation of the steering wheel causes rotation of the steering shaft. The coupling mechanism 6 is disclosed in detail in the following paragraphs and by reference to FIGS. 9 to 12. This steering wheel arrangement 10 is adapted to be mounted to the steering column (not shown) of a vehicle, an optional stalk set 7 being positioned between the housing 3 and the steering column.

The steering wheel arrangement 10 further comprises a central console 4 disposed in the central area of the steering wheel 1, above radial spokes 11 that connect an outer ring 12 to an annular central crown 14, the central console 4 being partially received inside the central crown 14. This central console 4 may be used for various purposes and, in particular, may incorporate one or several accessories, such as an air bag module 42 and electrical wires 44 adapted to supply current to the air bag module 42.

The central console 4 is fixedly connected to the stationary housing 3 through any conventional connecting means. Thus, when the steering wheel 1 rotates, the central console 4 remains stationary. This stationary position of the central console 4 allows the air bag module 42 to be always in the best position to guarantee maximum safety for the driver. This non-rotating air bag module 42 is fixedly connected to a clock-spring stator 45 on which the wires 44 are mounted, said clock-spring stator 45 being housed inside the central crown 14. An annular ball bearing 46 coaxially mounted between the central crown 14 and the housing 3 allows the rotation of the steering wheel 1 with respect to the housing 3 about the rotation axis X.

Figure 9:
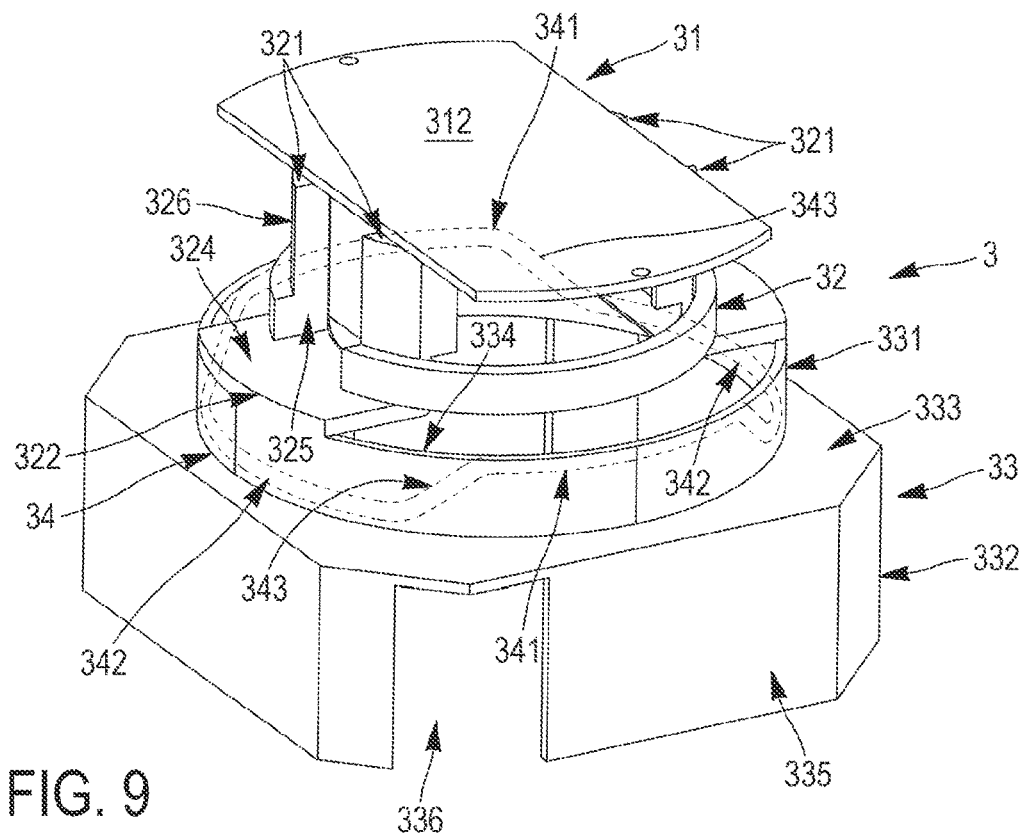
FIG. 9 is a perspective view of the housing of the steering wheel arrangement of FIG. 7.

FIG. 9 is an enlarged view of the housing 3 that is illustrated in FIG. 8. This housing 3 comprises an upper part 31 and a lower part 33 connected by a crosspiece 32. The upper part 31 includes a central base 312, which is substantially flat and rectangular, and which is aligned in a plane perpendicular to the axis X. The lower part 33 comprises a proximal portion 331 and a distal portion 332, the proximal portion 331 being closer to the upper part 31 than the distal portion 332. The proximal portion 331 has an annular shape and is connected to the central base 312 of the upper part 31 by the crosspiece 32, said crosspiece 32 being adapted to maintain a constant axial spacing between said central base 312 and an upper peripheral edge 334 of said proximal portion 331. The distal portion 332 has a parallelepiped shape and comprises an octagonal upper face 333 that is contiguous to the proximal portion 331 and eight side faces 335, three of which being provided with rectangular openings 336 through which the stalks of the stalk set 7 protrude. The crosspiece 32 comprises two planar sections 324 perpendicular to the axial direction and, contiguous thereto, a substantially annular section 325 aligned in an axial direction. Each planar section 324 is integral with the lower part 33 along a lower end 322, which is defined by a hemispherical portion of the upper peripheral edge 334 of the proximal portion 331. The substantially annular section 325 is connected to the upper part 31 through four pillars 326 extending along an axial direction. Each pillar 326 is integral with the upper part 31 at an upper end 321.

As illustrated in FIG. 9 by means of a broken line, the internal periphery of the proximal portion 331 is provided with a groove 34 that defines a closed path. The groove 34 includes two upper sections 341 and two lower sections 342, said upper and lower sections 341, 342 being shaped like a portion of a ring and being axially distant from each other. Each upper section 341 is linked to the lower sections 342 by two intermediate sections 343 extending obliquely relative the respective planes define by said upper and lower sections 341, 342. At least a part of each lower section 342 is axially aligned with one lower end 322 of the crosspiece 32. As explained in detail in the following paragraphs, this groove 34 defines the path followed by coupling elements 60 of the steering wheel arrangement 10 during the rotation of the steering wheel. In particular, each upper section 341 of the groove 34 is adapted to define an upper position of said coupling elements 60 and each lower section 342 is adapted to define a lower position of said coupling elements 60. More specifically, the groove 34 is configured such that, when the coupling elements 60 are in their lower positions, they are axially positioned below the crosspiece 32, and, when the coupling elements 60 are in their upper position, they are aligned with the crosspiece 32 in a plane perpendicular to the rotation axis X.

Figure 10:
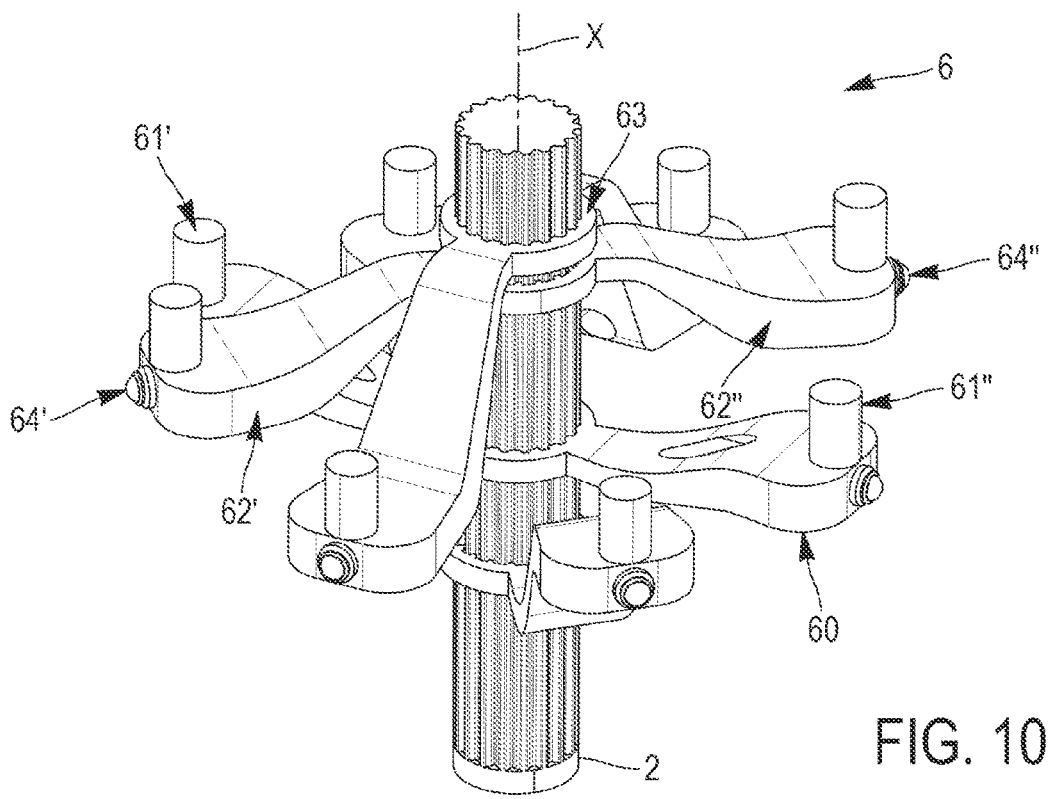
FIG. 10 is a perspective view of the coupling mechanism that causes rotation of the steering shaft in the steering wheel arrangement of FIG. 7.

FIG. 10 is an enlarged view of the coupling mechanism 6 that is illustrated in FIG. 8. This coupling mechanism 6 comprises four coupling elements 60 disposed around the steering shaft 2 at regular angular intervals. Each coupling element 60 consists in an arc-shaped spindle comprising a central ring 63 and two distal coupling pins, respectively a left coupling pin 61' and a right coupling pin 61", connected to the central ring 63 through two curved arms, respectively a left arm 62' and a right arm 62". The central ring 63 has a toothed inner periphery having a complementary form to the toothed outer periphery of the steering shaft 2 such that the central ring 63 is coaxially mounted on the steering shaft 2 when the teeth of the central ring 63 engage with the teeth of the steering shaft 2. Thus, a torque can be transmitted to the steering shaft 2 when the coupling elements 60 rotate or, inversely, a torque can be transmitted to the coupling elements 60 when the steering shaft 2 rotates. Furthermore, this arrangement allows an axial movement of the coupling element 60 relative to the steering shaft 2. The central ring 63 axially moves along the steering shaft 2 depending on the position of the coupling element 60. This position results from the engagement of two hemispherical tabs, respectively a left tab 64' and a right tab 64", protruding respectively from an external side of the left and right arms 62', 62" of the coupling element 60 inside the groove 34 of the housing 3. Thus, when the tabs 64', 64" follow the path defined by the upper sections 341 of the groove 34, the coupling element 60 is in its upper position, and, when the tabs 64', 64" follow the path defined by the lower sections 342 of the groove 34, the coupling element 60 is in its lower position. In this lower position, the coupling element 60 is positioned below the crosspiece 32, thus avoiding a restriction in the movement of the coupling element 60 due to the presence of the crosspiece 32 against which the coupling element 60 would abut if it were kept constantly in its upper position. The specific path defined by the groove 34 thus allows a 360° rotation of the coupling element 60 about the rotation axis X.

Figure 11:
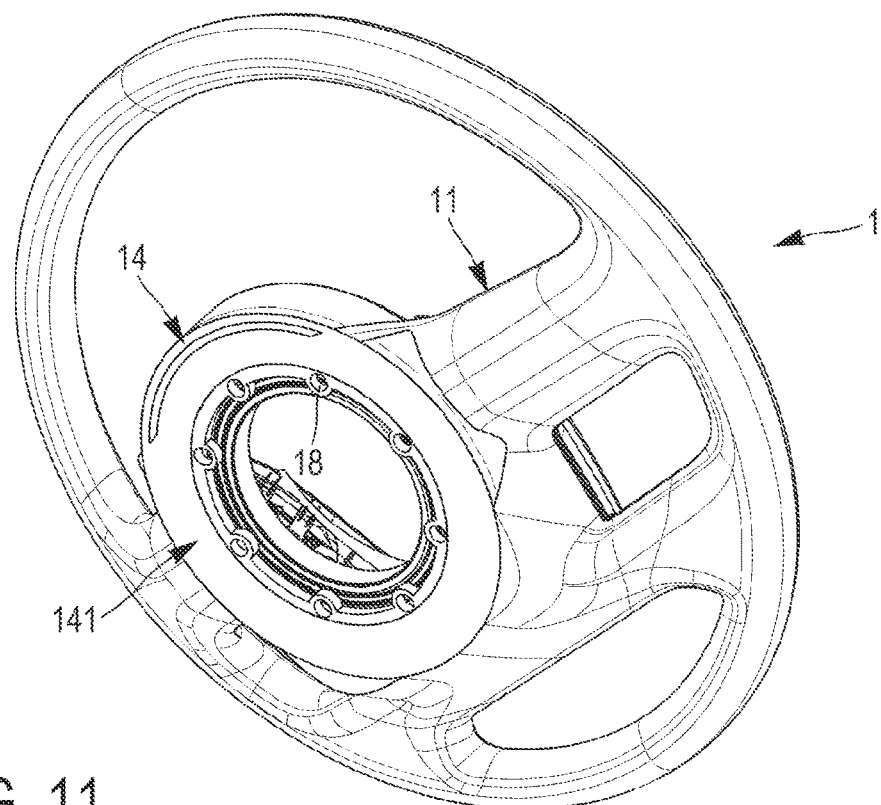
FIG. 11 is a perspective view of the steering wheel of the steering wheel arrangement of FIG. 7.
Figure 12:
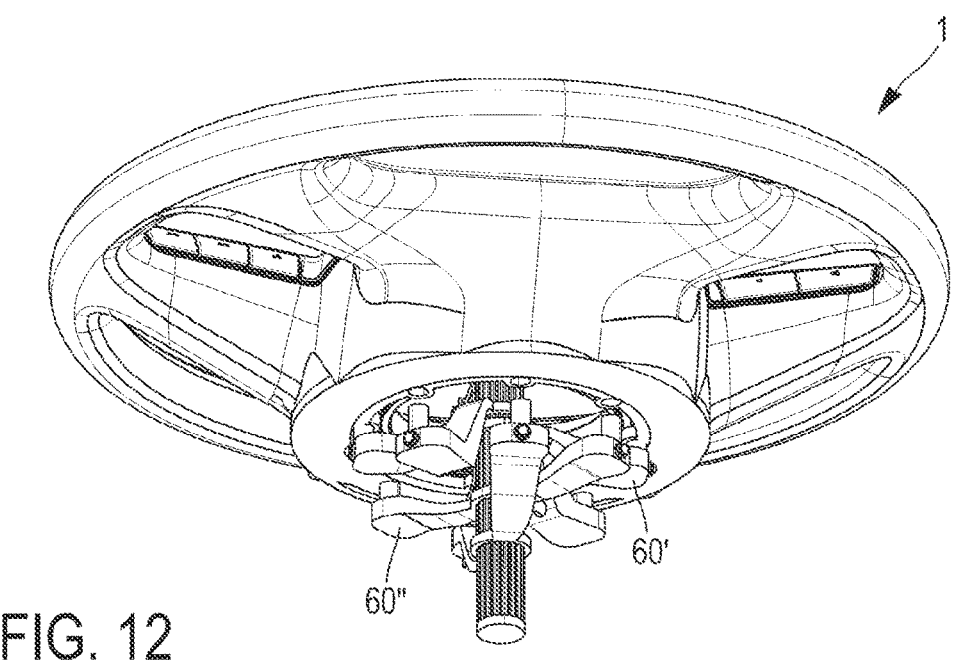
FIG. 12 is a view similar to FIG. 11, when the coupling mechanism of FIG. 10 is coupled to the steering wheel.

The rotation of the coupling elements 60 results from the rotation of the steering wheel 1. Indeed, as illustrated in FIGS. 11 and 12, the central crown 14 of the steering wheel 1 is provided at its bottom face 141, which faces the housing 3, with a series of eight axially oriented apertures 18. The apertures 18 are configured to receive the coupling pins 61', 61" of the coupling elements 60 when the coupling elements 60 are in their upper position (corresponding to the position of the coupling element 60' illustrated in FIG. 12), thus ensuring the transmission of a torque to said coupling element 60 when the steering wheel 1 rotates. When the coupling elements 60 are in their lower position (corresponding to the position of the coupling elements 60" illustrated in FIG. 12), their coupling pins 61', 61" are out of the apertures 18. Thus, in this lower position, the torque generated by the steering wheel 1 is not transmitted to the coupling elements 60". However, the coupling elements 60" rotate due to the gear engagement of their central ring 63 with the steering shaft 2. In the embodiment shown, the steering wheel arrangement 1 is configured such that at least one coupling element 60 is in its upper position whatever the angular position of steering wheel 1. In alternative embodiments of the present invention, the steering wheel arrangement 1 may comprise only three coupling elements 60 or more than four coupling elements 60. In further alternative embodiments of the present invention, the groove 34 may comprise only one lower section 342 or three or more lower sections 342, each lower section 342 being axially aligned with a corresponding crosspiece 32 of the housing 3 that connect together the upper and lower parts 31, 33.

It is to be understood that the present invention is not limited to the embodiments described above and illustrated in the drawings; rather, the skilled person will recognize that many changes and modifications may be made within the scope of the appended claims.

The invention claimed is:

1. A steering wheel arrangement, comprising:
   a steering wheel rotatable about a rotation axis,
   a steering shaft,
   a stationary housing covering at least partially the steering shaft and supporting at least one accessory,
   a plurality of coupling elements adapted to couple the steering wheel to the steering shaft, such that rotation of the steering wheel causes rotation of the steering shaft,
   wherein each coupling element is integral in rotation with the steering shaft and slidably movable along an axial direction between an upper position and a lower position, and in that each coupling element is detachably connected to the steering wheel, each coupling element being connected to the steering wheel in its upper position, such that rotation of the steering wheel causes rotation of the respective coupling element, and being disconnected from the steering wheel in its lower position, such that rotation of the steering wheel does not cause rotation of the respective coupling element.

2. The steering wheel arrangement according to claim 1, wherein the housing comprises an upper part and a lower part, said upper and lower parts being connected by at least one crosspiece, the at least one crosspiece being axially positioned above the coupling elements when said coupling elements are in their lower position, thus permitting a rotation of said coupling elements about the rotation axis, and the at least one crosspiece being aligned with the coupling elements in a plane perpendicular to the rotation axis when said coupling elements are in their upper position.

3. The steering wheel arrangement according to claim 1, wherein each coupling element comprises a hemispherical tab, each said hemispherical tab being engaged inside a groove of the housing, thus allowing the rotation of the corresponding coupling element about the rotation axis.

4. The steering wheel arrangement according to claim 3, wherein the groove defines a closed path such that, when the tab entirely follows said closed path, each coupling element rotates 360° around the rotation axis.

5. The steering wheel arrangement according to claim 3, wherein the groove includes at least one upper section and at least one lower section, said upper and lower sections being axially distant from each other, the at least one upper section defining the upper position of the coupling elements and the at least one lower section defining the lower position of the coupling elements.

6. The steering wheel arrangement according to claim 1, wherein each coupling element is formed of a substantially flat and circular base and of two teeth, respectively a distal tooth and a proximal tooth, projecting axially from said base, said distal and proximal teeth being aligned in a radial direction, wherein the steering wheel comprises a central crown, said central crown being provided with a series of distal notches on its inner periphery, each distal notch being configured to receive the distal tooth of one of the coupling elements when said coupling element is in its upper position, thus ensuring the transmission of a torque to said coupling element when the steering wheel rotates, said distal tooth being out of said distal notch when said coupling element is in its lower position, and wherein the steering shaft comprises a disc-shaped tray provided with a series of proximal notches on its outer periphery, each proximal notch being configured to receive the proximal tooth of one of the coupling elements whatever the position of said coupling element, thus ensuring the transmission of a torque to the steering shaft when the coupling element rotates or vice versa.

7. The steering wheel arrangement according to claim 6, wherein the height of the proximal tooth is greater than the height of the distal tooth, such that the proximal tooth is still received in the proximal notch in the lower position of the coupling element.

8. The steering wheel arrangement according to claim 6, wherein the central crown at least partially houses the at least one accessory.

9. The steering wheel arrangement according to claim 8, wherein the central crown houses an annular support element, which is fixedly connected to the housing and which supports electrical wires.

10. The steering wheel arrangement according to claim 9, further comprising an annular ball bearing coaxially mounted between the central crown and the housing, said ball bearing allowing the rotation of the steering wheel with respect to the housing about the rotation axis.

11. The steering wheel arrangement according to claim 1, wherein the steering shaft has a toothed outer periphery, wherein each coupling element consists in an arc-shaped spindle comprising a central ring and two distal pins, respectively a left pin and a right pin, connected thereto through two curved arms, respectively a left arm and a right arm, wherein the central ring has a toothed inner periphery, said central ring being coaxially mounted on the steering shaft that the teeth of the central ring engage with the teeth of the steering shaft, thus ensuring the transmission of a torque to the steering shaft when the corresponding coupling element rotates or vice versa while allowing an axial movement of the coupling element relative to the steering shaft, and wherein the steering wheel comprises a central crown, said central crown being provided with a series of axially oriented apertures that are adapted to receive the left and right pins of the coupling elements when the coupling elements are in their upper position, thus ensuring the transmission of a torque to said coupling elements when the steering wheel rotates, said left and right pins being out of said apertures when the coupling elements are in their lower position.

12. The steering wheel arrangement according to claim 1, wherein the at least one accessory is fixedly connected to the housing.

13. The steering wheel arrangement according to claim 1, wherein the at least one accessory is integral with the housing.

14. The steering wheel arrangement according to claim 1, wherein the at least one accessory is selected from the group consisting of a display unit, an airbag module, a switch and a horn pad.

15. A vehicle comprising a steering wheel arrangement according to claim 1.

\* \* \* \* \*